(12) United States Patent
Kim

(10) Patent No.: US 12,152,890 B2
(45) Date of Patent: Nov. 26, 2024

(54) TRAVEL DESTINATION SEARCHING SYSTEM AND METHOD USING COLOR BASED SPACE INFORMATION DATABASE

(71) Applicant: Huple Inc., Jeju-si (KR)

(72) Inventor: Hong Lae Kim, Jeju-si (KR)

(73) Assignee: HUPLE INC., Jeju-si (KR)

( * ) Notice: Subject to any disclaimer, the term of this patent is extended or adjusted under 35 U.S.C. 154(b) by 267 days.

(21) Appl. No.: 17/968,040

(22) Filed: Oct. 18, 2022

(65) Prior Publication Data

US 2023/0131392 A1    Apr. 27, 2023

(30) Foreign Application Priority Data

Oct. 25, 2021    (KR) .......................... 10-2021-0143029

(51) Int. Cl.
*G01C 21/00* (2006.01)
*G01C 21/34* (2006.01)
(Continued)

(52) U.S. Cl.
CPC ......... *G01C 21/3453* (2013.01); *G06F 16/29* (2019.01); *G06T 7/90* (2017.01); *G06T 2207/10024* (2013.01)

(58) Field of Classification Search
None
See application file for complete search history.

(56) References Cited

U.S. PATENT DOCUMENTS 8,452,794 B2 * 5/2013 Yang .................. G06F 16/532
707/767
8,589,410 B2 * 11/2013 Sud ..................... G06F 16/316
707/769
(Continued)

FOREIGN PATENT DOCUMENTS

KR    10-2010-0027722    3/2010
KR    10-2020-0091614    7/2020
KR    10-2195642    12/2020

*Primary Examiner* — Jonathan M Dager
(74) *Attorney, Agent, or Firm* — LEX IP MEISTER, PLLC

(57) ABSTRACT

A travel destination retrieval system using a coloration-based spatial information database includes a data collection unit configured to collect image data from a user terminal, a coloration extraction unit configured to analyze the collected image data to extract representative coloration information, an ID generation unit configured to generate representative ID information related to the representative coloration information, a travel destination information generation unit configured to generate travel destination information corresponding to the representative coloration information and the representative ID information, a data fusion unit configured to generate coloration space information by mapping the representative coloration information, the representative ID information, and the travel destination information to the image data, a data storage unit configured to store the generated coloration space information, and a travel destination information output unit configured to output recommended travel destination information in response to receiving information about a retrieval image for retrieving a travel destination from a user terminal based on a similarity between the retrieval image information and the coloration space information.

16 Claims, 10 Drawing Sheets

(51) Int. Cl.
*G06F 16/29* (2019.01)
*G06T 7/90* (2017.01)

(56) References Cited

U.S. PATENT DOCUMENTS

| | | | | |
|---|---|---|---|---|
| 8,676,803 | B1* | 3/2014 | Leung | G06F 16/58 |
| | | | | 707/737 |
| 8,983,939 | B1* | 3/2015 | Wang | G06F 16/9538 |
| | | | | 707/723 |
| 9,317,534 | B2* | 4/2016 | Brandt | G06F 16/9038 |
| 9,910,897 | B2* | 3/2018 | Becker | G06F 16/24578 |
| 10,437,868 | B2* | 10/2019 | Trifunovic | G06F 16/58 |
| 2005/0055344 | A1* | 3/2005 | Liu | G06F 16/5838 |
| 2008/0046409 | A1* | 2/2008 | Lieb | G06F 16/5838 |
| 2011/0072047 | A1* | 3/2011 | Wang | G06F 16/583 |
| | | | | 707/E17.071 |
| 2011/0085697 | A1* | 4/2011 | Clippard | G06V 10/758 |
| | | | | 382/100 |
| 2011/0184950 | A1* | 7/2011 | Skaff | G06F 16/54 |
| | | | | 715/810 |
| 2012/0113121 | A1* | 5/2012 | Luo | G06F 16/587 |
| | | | | 345/440 |
| 2012/0158784 | A1* | 6/2012 | Bluvband | G06F 16/532 |
| | | | | 707/E17.03 |
| 2012/0166472 | A1* | 6/2012 | Hoppenot | G06F 16/532 |
| | | | | 707/769 |
| 2013/0198197 | A1* | 8/2013 | Sawhney | G06F 40/30 |
| | | | | 707/E17.014 |
| 2014/0270498 | A1* | 9/2014 | Chester | G06V 10/56 |
| | | | | 382/162 |
| 2015/0378999 | A1* | 12/2015 | Dorner | G06F 16/5838 |
| | | | | 707/745 |
| 2015/0379731 | A1* | 12/2015 | Dorner | H04N 1/644 |
| | | | | 382/164 |
| 2015/0379743 | A1* | 12/2015 | Dorner | G06T 7/90 |
| | | | | 345/593 |
| 2018/0307706 | A1* | 10/2018 | Xiao | G06F 16/51 |
| 2021/0278953 | A1* | 9/2021 | Jang | G06F 9/451 |
| 2022/0011129 | A1* | 1/2022 | Hubbell | H04W 4/48 |
| 2022/0357161 | A1* | 11/2022 | DeLuca | G06V 10/56 |
| 2022/0364878 | A1* | 11/2022 | DeLuca | G06T 11/001 |
| 2024/0125609 | A1* | 4/2024 | Husain | G01C 21/3647 |

* cited by examiner (t1)　　　　　　　　(t2)　　　　　　　　(t3)

TRAVEL DESTINATION SEARCHING SYSTEM AND METHOD USING COLOR BASED SPACE INFORMATION DATABASE

BACKGROUND OF THE INVENTION

Field of the Invention

The present invention relates to a travel destination retrieval system and method, and more particularly to a travel destination retrieval system and retrieval method for retrieving an emotional travel destination as a visual element using a coloration-based spatial information database automated through big data-based learning.

Description of the Related Art

In general, retrieval of a travel destination is performed in such a way that a user inputs a keyword such as a name or a geographical location of the travel destination. For example, when the user plans to travel to Jeju Island, the user performs keyword retrieval based on local names related to Jeju Island, such as "Jeju-ro" or "Olle-gil".

Korea Patent Registration No. 10-2195642 (Dec. 21, 2020) (hereinafter referred to as "patent 642") discloses a terminal, a device, and a method for providing retrieval information based on color information capable of receiving an input of a keyword from a user, selecting a color based on a keyword-color information correlation degree stored in advance, and retrieving a recommendation highly related to the selected color. That is, the patent relates to a device for receiving an input of a keyword from a user and retrieving information about a specific product matching the keyword through color information suitable for the keyword of the user.

In this way, patent 642 merely discloses a configuration for providing, based on a color, information related to a keyword retrieved using a color information-keyword correlation degree, which is a correlation degree between a keyword such as an emotional word and color information, fails to disclose a scheme of collecting image data related to a color and an internal process for classifying and mapping the information to generate a database, and has no suggestion of a data structure for fusion of coloration information and spatial information by additionally mapping metadata and related data retrieved based on metadata to image data.

As will be described later, in the present invention, in a travel destination retrieval system, image data, metadata, hashtag information, related data, and representative color information are configured in the form of a dataset mapped to interconnected data, input numerous data is clustered and patterned for each similar subcategory through an unsupervised learning algorithm to generate a structured DB repeatedly trained over time, and travel destination information is automatically recommended or a desired travel destination is retrieved based thereon, which is an object of the present invention.

Therefore, in the present invention, by using coloration data extracted from an image, metadata included in the image, and related data acquired therethrough to cluster all of a background image, a color set of a color combination, a hashtag, and temporally and spatially related data through learning, it is possible to overcome limitations of a keyword-based retrieval DB and to construct a new type of upgraded database.

SUMMARY OF THE INVENTION

Therefore, the present invention has been made in view of the above problems, and it is an object of the present invention to provide a travel destination retrieval system and method using a coloration-based spatial information database capable of retrieving a recommended travel destination based on an image.

More specifically, with the recent development of SNS based on image and video retrieval, there is an increasing need to retrieve travel destinations based on non-standard data such as images and videos using keywords of landscape and scenery felt during travel such as "rapeseed flower," "buckwheat field," and "sunset" in addition to standard keywords such as local names and place names such as "Jeju Island" and "Olle-gil." Therefore, an object of the present invention is to provide a travel destination retrieval system using a coloration-based spatial information database that can represent such a feeling of landscape and scenery.

The problems of the present invention are not limited to the problems mentioned above, and other problems not mentioned herein will be clearly understood by those skilled in the art from the following description.

In accordance with an aspect of the present invention, the above and other objects can be accomplished by the provision of a travel destination retrieval system using a coloration-based spatial information database, the travel destination retrieval system including a data collection unit configured to collect image data from a user terminal, a coloration extraction unit configured to analyze the collected image data to extract representative coloration information of a coloration color scheme capable of representing at least a feature thereof in one or more combinations, an ID generation unit configured to generate at least one piece of representative ID information related to the representative coloration information, a travel destination information generation unit configured to generate travel destination information corresponding to the representative coloration information and the representative ID information, a data fusion unit configured to generate coloration space information connected to spatial information using a construction scheme in a structure of mapping a plurality of datasets including the representative coloration information, the representative ID information, and the travel destination information to the image data, a data storage unit configured to store the generated coloration space information, and a travel destination information output unit configured to output recommended travel destination information in response to receiving information about a retrieval image for retrieving a travel destination and keyword information from the user terminal based on a similarity with the coloration space information that can have a relationship with the information.

The travel destination retrieval system may further include an image preprocessing unit configured to remove or mask an obstructive object from the collected image data, in which the image preprocessing unit may remove or mask an obstructive object from the retrieval image, the coloration extraction unit may extract coloration information by analyzing the retrieval image from which the obstructive object is removed or masked, and the travel destination information output unit may compare coloration information extracted from the retrieval image with the coloration space information to output the recommended travel destination information.

The travel destination retrieval system may further include a metadata extraction unit configured to extract metadata of the image data, in which the travel destination information generation unit may generate the travel destination information corresponding to the metadata, and the data fusion unit may further map the metadata to the image data to generate the coloration space information.

The metadata may include unique time information and location information formed when image data is generated, data such as weather and traffic associated with the information, and utilization information such as news, trends, and hashtags.

The travel destination retrieval system may further include a related data retrieval unit configured to retrieve data from a DB storing related data retrieved through an Internet protocol network based on the mapped metadata and related data or a dataset based on the metadata, in which the data fusion unit may further map the related data to the image data to generate the coloration space information.

The travel destination retrieval system may further include a hashtag information collection unit configured to collect hashtag information corresponding to the image data from the user terminal, in which the travel destination information generation unit may generate the travel destination information corresponding to the hashtag information, and the data fusion unit may additionally map the hashtag information to the image data to generate the coloration space information.

The data fusion unit may generate a hashtag and a keyword having a high correlation degree through comparison between respective pieces of the coloration space information, and additionally connect the hashtag and the keyword to each piece of the coloration space information.

The data fusion unit compares and classifies data through an AI algorithm of an unsupervised learning method to generate the hashtag and keyword having the high correlation degree, and a correlation degree of the hashtag and keyword linked to the coloration space information is analyzed according to an influence of the classified clustering.

When the coloration space information is additionally generated, the data fusion unit repeats the analysis to increase a matching rate according to learning of the algorithm, thereby connecting the analyzed hashtag and keyword to each piece of the coloration space information.

That is, an existing keyword retrieval system or an existing recommendation system using a keyword fails to disclose travel destination retrieval through an image, and has no suggestion of a technical element that automatically constructs structured retrieval having a high matching rate through repeated learning in a DB of classification data combined with spatial information using metadata in extracted coloration data of an image. Therefore, there is a difference in that it is impossible to achieve an effect of visualizing and providing recommended travel destination information based on a coloration-based spatial information DB trained through repeated retrieval over time in retrieving recommended travel destination information based on an image.

The travel destination retrieval system may further include a recommended information provision unit configured to provide recommended image information and recommended keyword information to the user terminal based on the coloration space information.

The recommended information provision unit may provide the recommended image information and the recommended keyword information using at least one of time information, location information, or retrieval history information received from the user terminals.

The travel destination retrieval system may further include an image classification unit configured to analyze the image data collected by the data collection unit to classify or discard the image data for each preset category.

The travel destination information output unit may display the recommended travel destination information together with a representative image at a corresponding location on a map screen.

In accordance with another aspect of the present invention, there is provided a travel destination retrieval method using a coloration-based spatial information database and a server connected to a plurality of user terminals through a network, the travel destination retrieval method including collecting, by the server, image data from a user terminal, removing or masking, by the server, an obstructive object from the collected image data, analyzing, by the server, the image from which the obstructive object is removed or masked to extract at least one piece of representative coloration information, generating, by the server, at least one piece of representative keyword information related to the representative coloration information, generating, by the server, travel destination information corresponding to the representative coloration information and the representative keyword information, generating, by the server, coloration space information using a scheme of constructing a dataset by mapping the representative coloration information, the representative keyword information, and the travel destination information to the image data, receiving, by the server, information about a retrieval image for retrieving a travel destination from the user terminal, and outputting, by the server, recommended travel destination information based on a similarity between the retrieval image information and the coloration space information.

The outputting may include removing or masking an obstructive object from the retrieval image, and analyzing the retrieval image from which the obstructive object is removed or masked to extract coloration information.

The travel destination retrieval method may further include extracting, by the server, metadata of the image data, in which the generating of the travel destination information may include generating the travel destination information corresponding to the metadata, and the generating of the coloration space information may include generating the coloration space information by additionally mapping the metadata to the image data.

The travel destination retrieval method may further include retrieving, by the server, related data through an Internet protocol network based on the metadata, in which the generating of the coloration space information may include generating the coloration space information by additionally mapping the related data to the image data.

The generating of the coloration space information may include generating, by the server, the coloration space information using a scheme of automatically clustering the dataset through an unsupervised AI learning algorithm.

The outputting may include displaying the recommended travel destination information together with a predetermined representative image at a corresponding location on a map screen.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
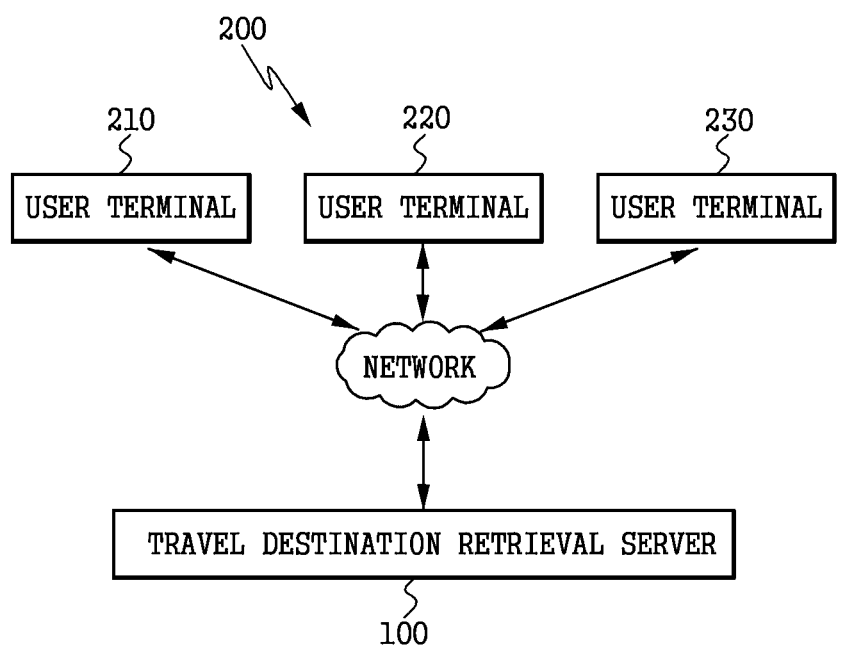
FIG. 1 is a conceptual diagram illustrating a network to which a travel destination retrieval server according to an embodiment of the present invention is applied.

Advantages and features of the present invention and methods of achieving the advantages and features will become apparent with reference to the embodiments described below in detail in conjunction with the accompanying drawings. However, the present invention is not limited to the embodiments disclosed below, and may be implemented in various different modes. The present embodiments are merely provided so that the disclosure of the present invention is complete, and those of ordinary skill in the art to which the present invention belongs are completely informed of the scope of the invention. Further, the present invention is only defined by the scope of the claims. Like reference numerals refer to like elements throughout the specification.

Hereinafter, a travel destination retrieval system using a coloration-based spatial information database according to embodiments of the present invention will be described with reference to the drawings.

FIG. 1 is a conceptual diagram illustrating a network to which a travel destination retrieval server according to an embodiment of the present invention is applied.

Referring to FIG. 1, the travel destination retrieval server 100 according to an embodiment of the present invention is connected to a user terminal 200 through a wired or wireless Internet protocol network.

In the present specification, the travel destination retrieval system of the present invention may include one or a plurality of servers. Hereinafter, for convenience, the travel destination retrieval system including the travel destination retrieval server 100, which is one server, will be described as an example.

However, the travel destination retrieval server 100 is not limited to a server including a single computer, and it is possible to adopt an embodiment in which a sub-component is configured as a separate server.

The travel destination retrieval server 100 refers to a server computer that provides a website or application for retrieving a travel destination to the user terminal 200 through the Internet protocol network, and the user terminal 200 refers to various terminals such as a smartphone, a tablet computer, a laptop computer, a smart watch, smart glasses, and other computers used by a user to retrieve a travel destination.

The travel destination retrieval server 100 may provide a website or an application program for travel destination retrieval to a plurality of user terminals 210, 220, and 230 through a network.

The website or an application provided by the travel destination retrieval server 100 to the user terminal 200 may be implemented in the form of a program command that can be executed through various computer means and recorded in a computer-readable medium.

The computer-readable medium may include program instructions, data files, data structures, etc. alone or in combination.

The program instructions recorded on the medium may be specially designed and configured for the present invention, or may be known and available to those skilled in the art of computer software.

Figure 2:
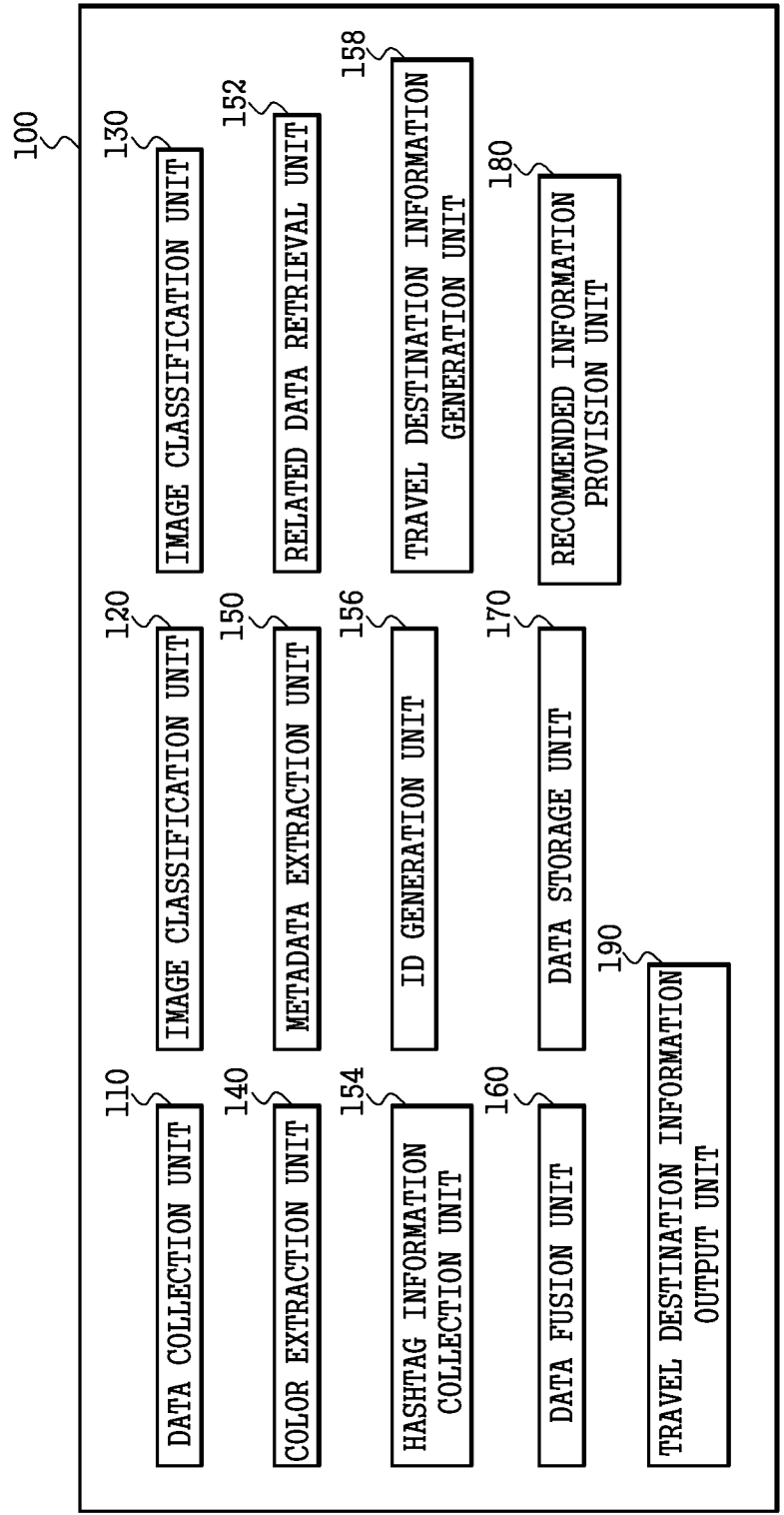
FIG. 2 is a detailed configuration diagram of the travel destination retrieval server according to an embodiment of the present invention.

FIG. 2 is a detailed configuration diagram of the travel destination retrieval server according to an embodiment of the present invention.

Referring to FIG. 2, the travel destination retrieval server 100 includes a data collection unit 110, an image classification unit 120, an image preprocessing unit 130, a coloration extraction unit 140, a metadata extraction unit 150, a related data retrieval unit 152, a hashtag information collection unit 154, an ID generation unit 156, a travel destination information generation unit 158, a data fusion unit 160, a data storage unit 170, a recommended information provision unit 180, and a travel destination information output unit 190.

The data collection unit 110 collects various image data from the user terminal 200, and collects other necessary data through the Internet protocol network.

The image classification unit 120 analyzes the image data collected by the data collection unit 100 to classify the image data for each preset category or discharge the image data when the image data does not meet a criterion.

For example, the image classification unit 120 analyzes a pattern of collected image data using a pre-constructed algorithm to determine whether the image is a landscape photograph, a building photograph, etc., and classifies the image data for each similar category. The image may be discarded upon determining that the category cannot be analyzed or classified according to a preset rule.

The image classification unit 120 uses an OpenCV library, and may use, for example, algorithms such as a CNN algorithm, which is a type of deep learning algorithm, and a support vector machine (SVM), random forest, AdaBoost, etc., which are types of machine learning algorithms.

The image preprocessing unit 130 removes or masks the obstructive object from the image data collected by the data collection unit 110.

The image preprocessing unit 130 may use R-CNN, Faster R-CNN, Mask R-CNN, etc. pertaining to the CNN algorithm as an object recognition algorithm.

The obstructive object refers to an object that interferes with main image content according to a criterion set in advance in the corresponding category according to the category of the image data classified by the image classification unit 120.

For example, when the collected image is a landscape photograph, a person included in the landscape photograph may be determined as an object (foreground) interfering with the landscape (background).

The image preprocessing unit 130 may analyze the image to extract an outline of the person who is an obstructive object, and remove the obstructive object or perform masking to re-edit the image into a refined image in which only a landscape photograph region remains.

The image preprocessor 130 may remove or mask the obstructive object as described above for various categories using the above-described scheme.

The coloration extraction unit 140 analyzes an image from which the obstructive object is removed or masked by the image preprocessor 130 to extract at least one piece of representative coloration information.

The coloration extraction unit 140 may extract various colors from an image file using a K-means clustering algorithm, a mean-shift clustering algorithm, etc.

That is, the coloration extraction unit analyzes the collected images and extracts representative coloration information of a coloration scheme (combination) capable of representing at least one feature in one or more combinations.

A configuration of the image preprocessing unit 130 may be omitted. However, when the obstructive object is not removed or masked, accuracy of color information representing the corresponding image may deteriorate in the coloration information extracted from the coloration extraction unit 140. Therefore, including the configuration of the image preprocessing unit 130 as much as possible is more efficient and preferable in increasing a matching rate when a DB is constructed by the data fusion unit to be described later.

The metadata extraction unit 150 extracts various metadata included in the collected image data.

The metadata of the image data may representatively include time information and location information. For example, when the user uploads a photograph image captured using the user terminal 200, a photographing date, a photographing time, GPS coordinate information, etc. may be stored as metadata in the image. In addition, it is possible to include various types of metadata such as detailed imaging device information (manufacturer, model name, etc.), imaging setting conditions (focal length, flash, ISO sensitivity, aperture status, shutter speed, rotation direction, color space, etc.), illuminance (amount of light), direction information, image pixels, copyright information, and image description.

The metadata extraction unit 150 extracts metadata such as a photographing date, a photographing time, and GPS coordinate information, the travel destination information generation unit 158 to be described later generates travel destination information corresponding to the metadata, and the data fusion unit 160 to be described later additionally maps metadata to the image data to generate coloration space information.

In an embodiment, the metadata may include unique time information and location information formed when image data is generated, data such as weather and traffic associated with the information, and utilization information such as news, trends, and hashtags. Alternatively, such utilization information may be stored in a separate record and mapped as related data.

The related data retrieval unit 160 retrieves related data through the Internet protocol network based on the metadata.

For example, the related data retrieval unit 160 may retrieve event information or weather information occurring in a corresponding region corresponding to the date, time, and GPS coordinate information based on the photographing date, the photographing time, and the GPS coordinate information.

Related data such as related weather, traffic, and event information may be retrieved or generated through the Internet protocol network based on the metadata, or existing related data or a stored dataset DB may be autonomously retrieved to generate related data based on the metadata.

The data fusion unit 160 to be described later may generate coloration space information by additionally mapping the related data to the image data.

The data fusion unit constructs a plurality of datasets including representative ID information representing the image reviewed above and extended information that can be related to the travel destination information in a mapping structure, and generates coloration space information connected to spatial information.

In an embodiment, the data fusion unit may be upgraded by generating a hashtag and a keyword having a higher statistical and relative correlation degree through comparison between the respective pieces of coloration space information and additionally connecting the hashtag and the keyword to each piece of coloration space information.

In addition, in an embodiment, the data fusion unit may repeat an AI algorithm of an unsupervised learning method in order to generate the hashtag, ID, or keyword information having a high correlation degree, compare and classify data in this way, and analyze a correlation degree (association rule) of the hashtag and keyword linked to the coloration space information according to a degree of influence of the classified clustering.

In addition, in an embodiment, when the coloration space information is additionally generated, the data fusion unit may repeat this analysis to perform patterning and clustering according to learning of the unsupervised algorithm, thereby increasing the matching rate, and newly connect the hashtag and ID information to each piece of coloration space information.

Therefore, according to an embodiment of the present application, a structured retrieval DB having a high matching rate may be automatically constructed by repeatedly learning such a process in a classification data DB that combines spatial information using coloration data extracted from an image and metadata included in the image.

Next, the hashtag information collection unit 170 collects hashtag information corresponding to image data from the user terminal 200.

For example, the user may input a keyword such as "sunset," "autumn," "rapeseed flower," "buckwheat field," "love," or "with family" and input hashtag information together with the keyword while uploading a photograph image to a website or an application provided by the travel destination retrieval server 100 of the present invention to the user terminal 200. The hashtag information collection unit 170 may collect such hashtag information. The travel destination information generation unit 158, which will be described later, may generate coloration space information by additionally mapping the hashtag information to image data.

The ID generation unit 156 may analyze an image in the coloration extraction unit 140, extract representative coloration information of a coloration color scheme representing a feature in one or more combinations, and then generate and assign at least one piece of representative ID information related to representative coloration information.

The representative coloration information may include main color set information of image data, and the ID generation unit 156 generates an ID mapped and corresponding to each piece of color set information.

As an algorithm for generating an ID associated with an image by the ID generation unit 156, it is possible to use a method of matching an ID according to classification of the image and a method of matching an ID according to classification of the image on an SNS using a topic-based modeling technique, and it is possible to use an algorithm such as LSA, LDA, or PLSI.

In this instance, ID information corresponding to each piece of color set information may be learned in advance and used to construct a database, and may be continuously learned and repeatedly updated due to an additional image input to the server 100.

Each piece of color set information may include, for example, 3 to 5 colors, and a plurality of pieces of ID information (for example, keywords) may be matched to one piece of color set information.

The travel destination information generation unit 158 may generate travel destination information corresponding to the representative color information and the representative ID information.

That is, the travel destination information generation unit 158 may generate appropriate travel destination information based on color set information including corresponding ID information.

In addition, the travel destination information generation unit 158 may generate suitable travel destination information by further considering metadata extracted from the image, related data retrieved therefrom, and collected hashtag information in addition to the representative coloration information and the representative ID information as described above.

In this instance, travel destination information related to representative coloration information, representative ID information, metadata, related data, and hashtag information may be converted into a database through unsupervised learning due to input/processing/retrieval of tens of thousands to millions of images or retrieval terms to construct a DB having a high matching rate.

In this instance, travel destination information related to color set information and ID information may have already been constructed as a database.

The data fusion unit 160 generates coloration space information by mutually mapping the representative coloration information, representative ID information, metadata, related data, hashtag information, etc. to the collected image data.

Figure 5:
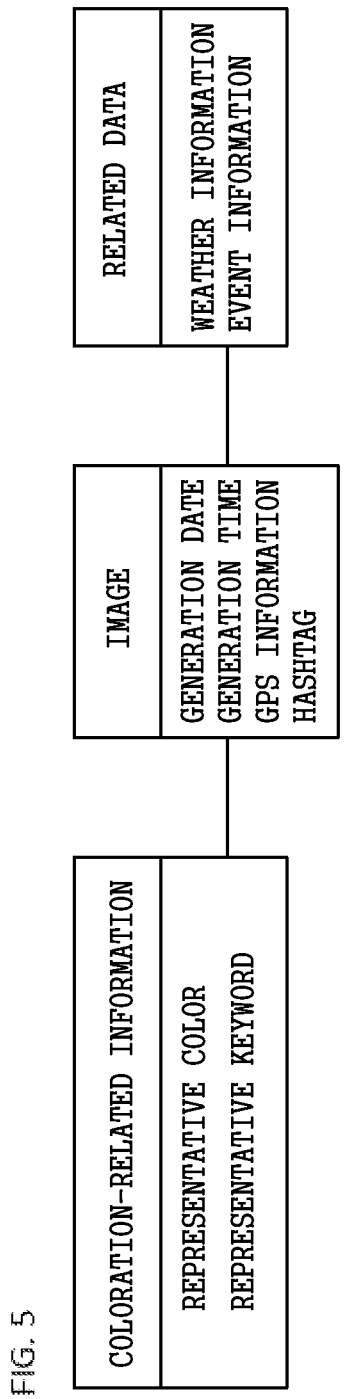
FIG. 5 is a diagram illustrating coloration space information generated by the travel destination retrieval server of the present invention.

The generated coloration space information refers to data for constructing a coloration-based spatial information database in which travel destination information and color information are matched, and a more detailed data configuration is illustrated in FIG. 5.

Referring to FIG. 5, the coloration space information is configured as a set of image data, coloration-related information, and related data.

The image data includes hashtag information and metadata such as a generation date, a generation time, and GPS information in pixel information included in the image.

Strictly, metadata is data stored together with image data when the image data is stored, and hashtag information is information stored in association with an image and stored separately, and is described as being included in the image data for convenience.

The metadata of the image data may representatively include time information and location information, and the photographing date, the photographing time, the GPS coordinate information, etc. may be stored as metadata together with the information. In addition, it is possible to include various meta information such as manufacturer and model name of an imaging device, focal length, flash, ISO sensitivity, aperture status, shutter speed, rotation direction, color space, illuminance, image pixel information, artist copyright information, and other descriptions.

The coloration-related information refers to representative color information and representative ID information including at least one coloration color scheme extracted from image data.

That is, the representative color information refers to representative color set information extracted from image data, and the representative ID is a keyword corresponding to the color set information and is information related to coloration of the image.

The related data is various available information such as weather information, traffic information, and event information related to the metadata of the image data and refers to information related to the image.

The related data may be collected from a website, an SNS, an accessible server, etc. through the Internet protocol network based on the metadata, or the related data may be generated by autonomously retrieving existing related data or a prestored dataset DB based on the metadata. Further, nth-order related data may be additionally generated through an iterative collection process based on the collected related data according to system settings.

The representative ID above is a keyword corresponding to the color set information, which can be updated in a state in which a related database is constructed in advance, and can be constructed using an automatic clustering scheme as time passes and the amount of processed data accumulates through an unsupervised AI learning algorithm.

Specifically, as illustrated in FIG. 5, the coloration space information is constructed in the form of a dataset in which image data, metadata, hashtag information, related data, and representative color information are mapped to interconnected data. When a lot of data is input through the unsupervised AI learning algorithm described above, the data may be automatically clustered and patterned for each similar subcategory.

In this instance, the representative ID information may be updated and generated from information commonly extracted from each piece of clustered coloration space information.

The data storage unit 170 stores the generated coloration space information.

The recommended information provision unit 180 provides recommended image information and recommended keyword information for travel destination retrieval to the user terminal 200 based on the coloration space information.

In this instance, the recommended information provision unit 180 may provide recommended image information and recommended keyword information using at least one of time information, location information, and retrieval history information received from the user terminal 200.

Upon receiving retrieval image information for retrieving a travel destination from the user terminal 200, the travel destination information output unit 190 outputs recommended travel destination information based on a similarity between the retrieval image information and coloration space information, which is a structured DB.

In this instance, when a retrieval image is received from the user terminal 200, an obstructive object is removed or masked from the retrieval image through the image preprocessing unit 130, and representative coloration information is extracted from the retrieval image, from which the obstructive object is removed or masked, by the coloration extraction unit 140.

The travel destination information output unit 190 may output recommended travel destination information by comparing the representative coloration information extracted from the retrieval image with the coloration space information.

That is, when a retrieval image and keyword information for retrieving a travel destination is received, recommended travel destination information is output based on consistency with the coloration space information that can form a relationship with the information.

Therefore, while recalling an emotional travel destination, in response to the question "Where can I experience that feeling?", the present invention may recommend a travel destination with a high matching rate using a coloration-based spatial information database with only a basic retrieval image and keyword.

Figure 3:
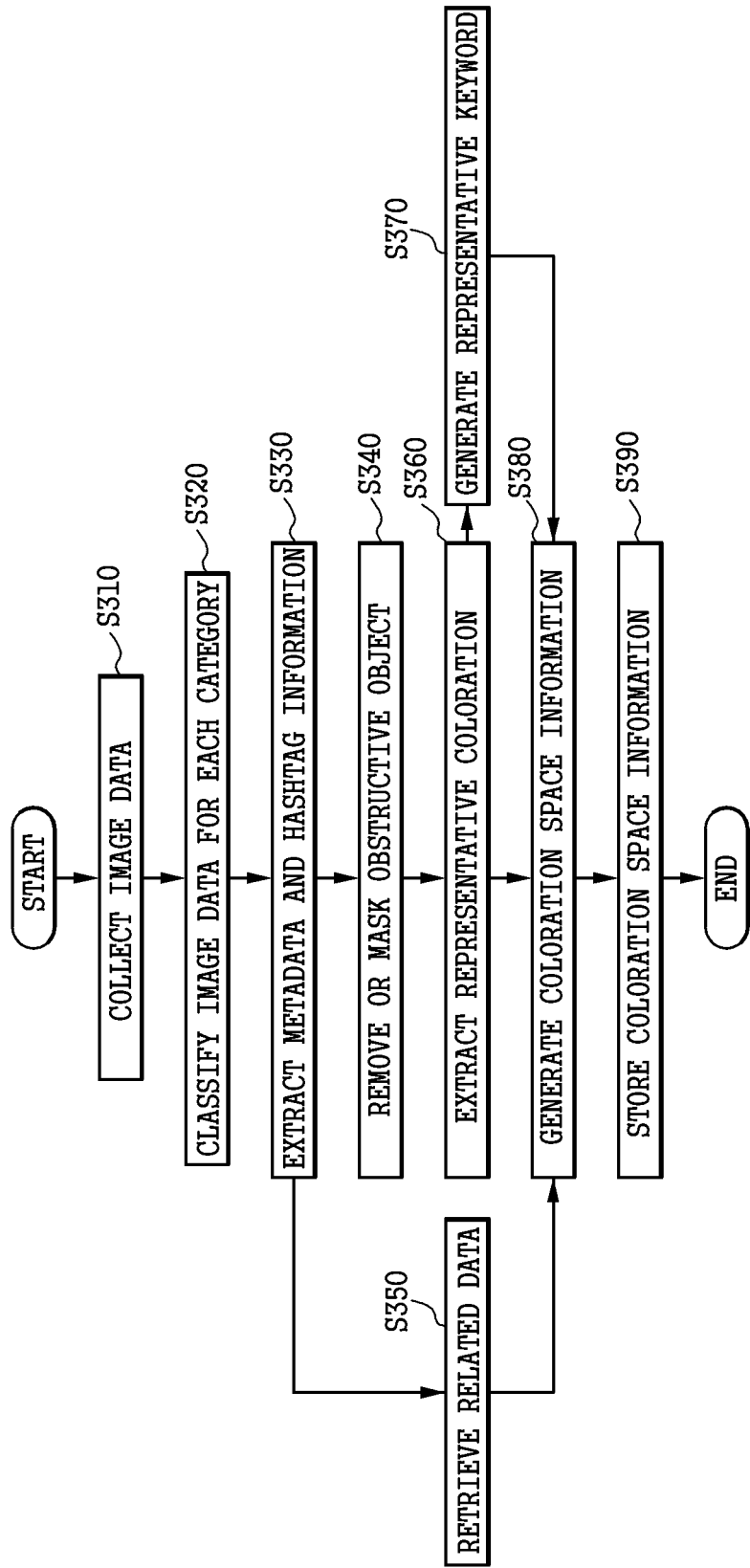
FIG. 3 is a flowchart illustrating a method of generating coloration space information by the travel destination retrieval server according to an embodiment of the present invention.

FIG. 3 is a flowchart illustrating a method of generating coloration space information by the travel destination retrieval server according to an embodiment of the present invention.

First, the travel destination retrieval server 100 collects image data from the user terminal 200 through a website or an application (S310).

When the image data is collected, the image data is classified for each preset category using the image classification unit 120 (S320).

That is, the image classification unit 120 analyzes a pattern of collected image data using an algorithm to determine whether an image is a landscape photograph or a building photograph, classifies the image for each similar category, and may discard the image upon determining that the category does not correspond to a preset rule or cannot be classified.

In addition, metadata and hashtag information of the image data are extracted (S330).

In addition, the collected image data may be processed to remove or mask the obstructive object according to a criterion for each classified category through the image preprocessing unit 130 (S340).

When the collected image is preprocessed and the obstructive object is removed, the image refined in this way is analyzed to extract at least one piece of representative coloration information (S360).

When the representative coloration information is extracted from the collected image, at least one representative ID corresponding to the extracted representative coloration information is generated (S370).

Meanwhile, when metadata is extracted from the image data in step S330, related data is retrieved based on the metadata (S350).

When all of the above steps are performed, coloration space information is generated based on the related data retrieved in step S350, the representative coloration information generated in step S380, and the representative ID information generated in step S370 (S380).

The coloration space information generated in this way is stored in the data storage unit 170.

Figure 4:
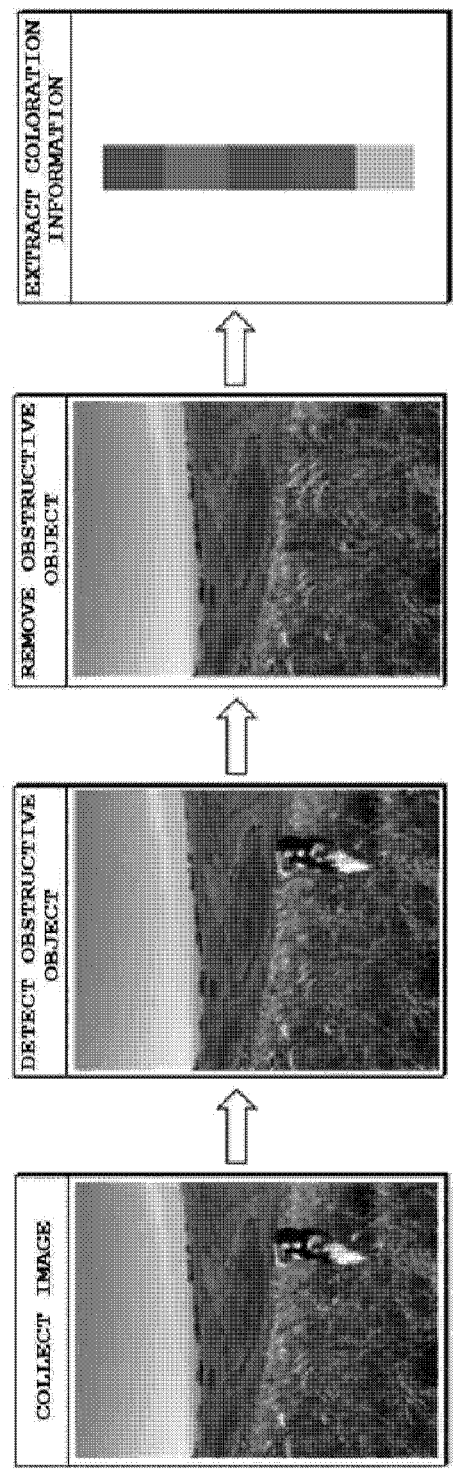
FIG. 4 is a diagram illustrating a process in which the travel destination retrieval server removes an obstructive object from image data and extracts coloration information according to an embodiment of the present invention.

FIG. 4 is a diagram illustrating a process in which the travel destination retrieval server removes an obstructive object from image data and extracts coloration information according to an embodiment of the present invention.

Referring to FIG. 4, a photograph has one person disposed on a landscape screen. The figure illustrates a process of a scheme of removing an obstructive object and extracting coloration information when an image is collected.

When the image is collected, the image is classified into a category of a landscape photograph by an image recognition algorithm, and an obstructive object removal algorithm recognizes a person included in the photograph as an obstructive object in response to the category of the landscape photograph.

Therefore, after detecting an outer region of the person, the person region is masked to remove the person excluding the background as a foreground from the landscape photograph, and the image from which the foreground is removed is analyzed as a clean image to extract related coloration information.

FIG. 4 illustrates that five pieces of representative color information (combination) are finally extracted, and colors from the top to the bottom may be arranged in order according to the amount corresponding to a distribution ratio of the colors.

Figure 6:
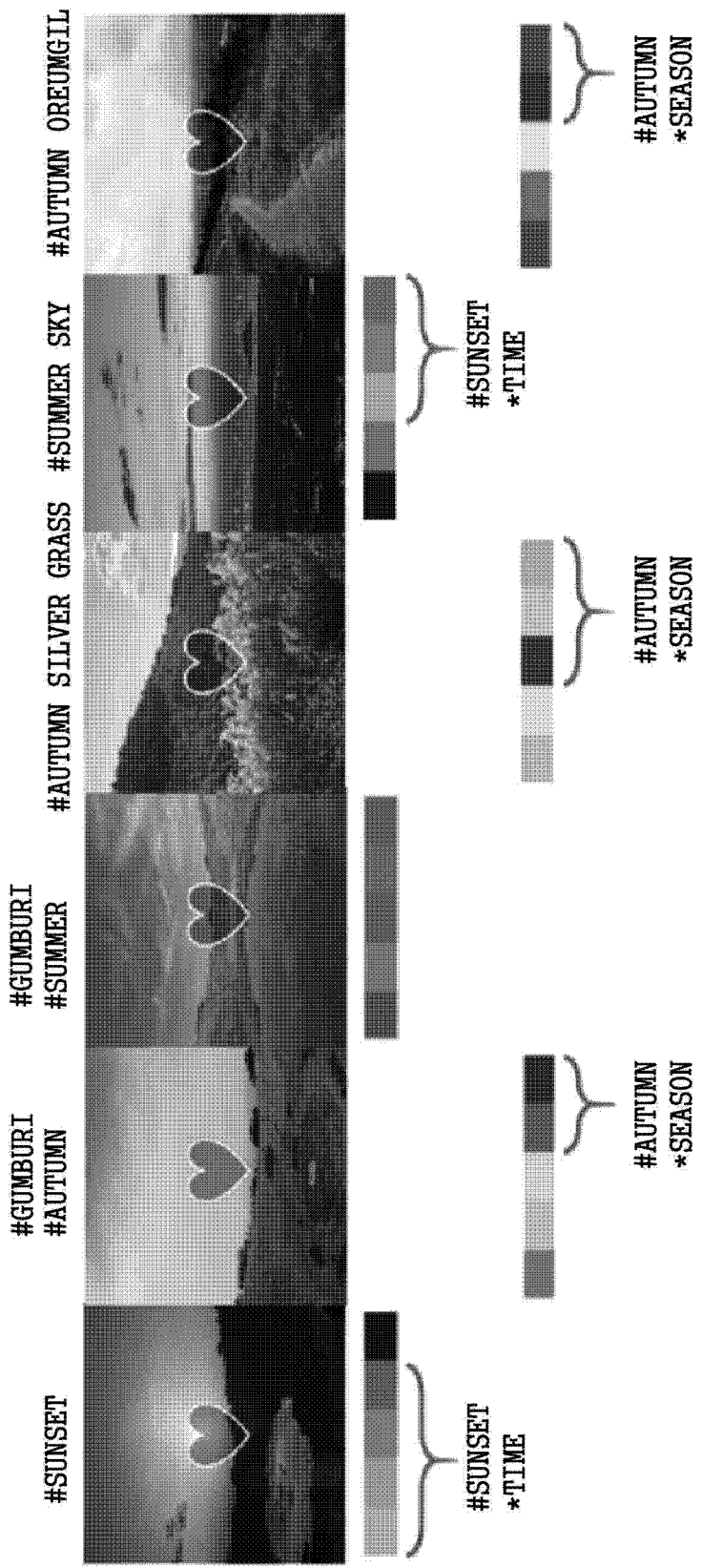
FIG. 6 is a diagram for describing a method of generating coloration space information using metadata and hashtag information by the travel destination retrieval server of the present invention.

FIG. 6 is a diagram for describing a method of generating coloration space information using metadata and hashtag information by the travel destination retrieval server of the present invention.

FIG. 6 illustrates a result of automatically clustering coloration space information of a dataset illustrated in FIG. 5 through an AI unsupervised learning algorithm.

That is, hashtag information starting with "#" is displayed at the top of each photograph in FIG. 6. For example, a first photograph on the left is an image of an evening glow landscape. In this case, "#sunset" information is collected as a hashtag, and "*time" information is mainly collected as meta information.

Therefore, the "sunset" and "time" information are matched to representative color set information extracted by analyzing the evening glow landscape image, so that the coloration space information may be significantly accurately clustered. That is, coloration space information based on one piece of spatial information is generated by matching the corresponding color set information with the keyword "sunset" in the evening.

Similarly, in a first photograph on the far right, coloration space information may be generated by matching "Oreumgil" and "season" to the corresponding color set information based on hashtag information "#Autumn Oreumgil" and meta information "*season". An example in which a tag "autumn" is input as a hashtag has been described. However, even when "autumn" is not present in the hashtag, a season at the time the image is captured may be automatically determined based on a photographing date included in the metadata, and coloration space information may be automatically generated in this way.

Similar data as in FIG. 6 may be automatically clustered through an unsupervised algorithm while being continuously updated over time, and color set information and keyword information may be matched with various types of travel destination place information.

Figure 7:
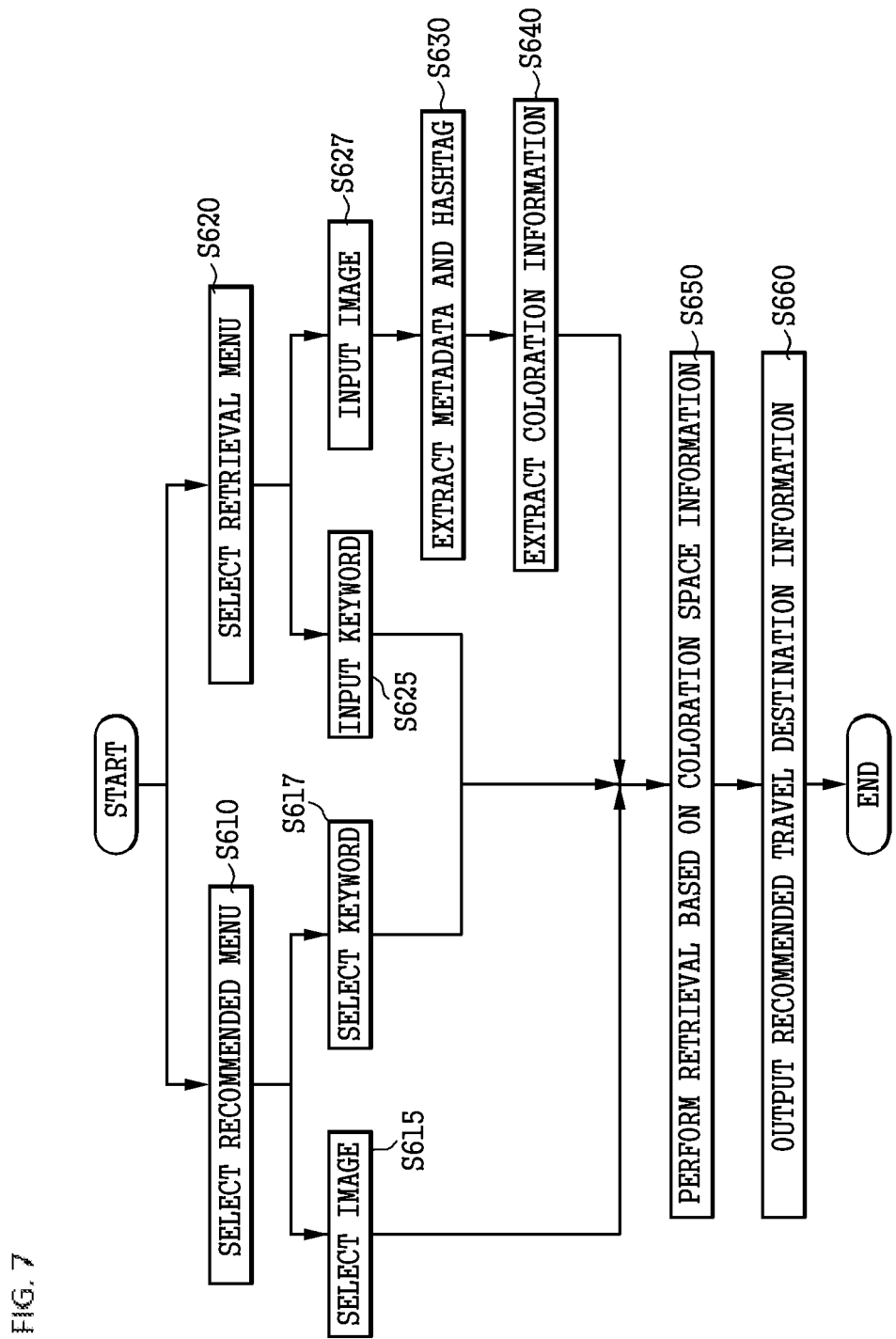
FIG. 7 is a flowchart illustrating a process of retrieving recommended travel destination information through the travel destination retrieval server according to an embodiment of the present invention.

FIG. 7 is a flowchart illustrating a process of retrieving recommended travel destination information through the travel destination retrieval server according to an embodiment of the present invention.

In response to entering travel destination retrieval menu in a website or an application provided on the user terminal 200, a screen for selecting a recommended menu or selecting a retrieval menu appears.

When the user selects the recommended menu (S610), a recommended image or a recommended keyword is displayed on the user terminal 200 according to a preset algorithm.

In this instance, the recommended image or the recommended keyword is a recommended image or a recommended keyword corresponding to a most popular travel destination in a specific travel destination region selected by the user, or may be provided based on retrieval history information previously formed by the user through the user terminal 200.

When the user selects a retrieval menu (S620), a user interface for inputting a retrieval keyword or uploading a retrieval image is displayed on the user terminal 200.

The user may retrieve a recommended travel destination by directly inputting a keyword (S625), or may retrieve a recommended travel destination by uploading an image captured by the user or an image owned by the user (S627).

When the image is uploaded and input in step S627, metadata and a hashtag are extracted in the same way as described above (S630), and representative coloration information is extracted (S640).

When the metadata, the hashtag, and the coloration information are extracted in step S640, the data is compared with pre-constructed coloration space information to perform retrieval (S650).

When a keyword is input by the user in step S625, the input keyword is compared with the coloration space information to perform retrieval (S650).

When keyword information matching the keyword input by the user in step S650 is included in the coloration space information, retrieval may be performed directly from the pre-constructed database.

When there is no keyword information matching the keyword input by the user in step S650, color information matching the input keyword may be determined, and retrieval may be performed by comparing the determined color information with the coloration space information.

In this instance, the method of determining the color information matching the input keyword may be performed by retrieving and extracting image data matching the keyword in real time through the Internet protocol network to analyze representative color information or may be performed through a pre-constructed keyword-color association database.

When the user selects a recommended image or keyword in step S615 or S617, retrieval is immediately performed based on the constructed coloration space information (S650).

When the recommended travel destination is retrieved as described above, information about the recommended travel destination is output to the user terminal 200 (S660).

Figure 8:
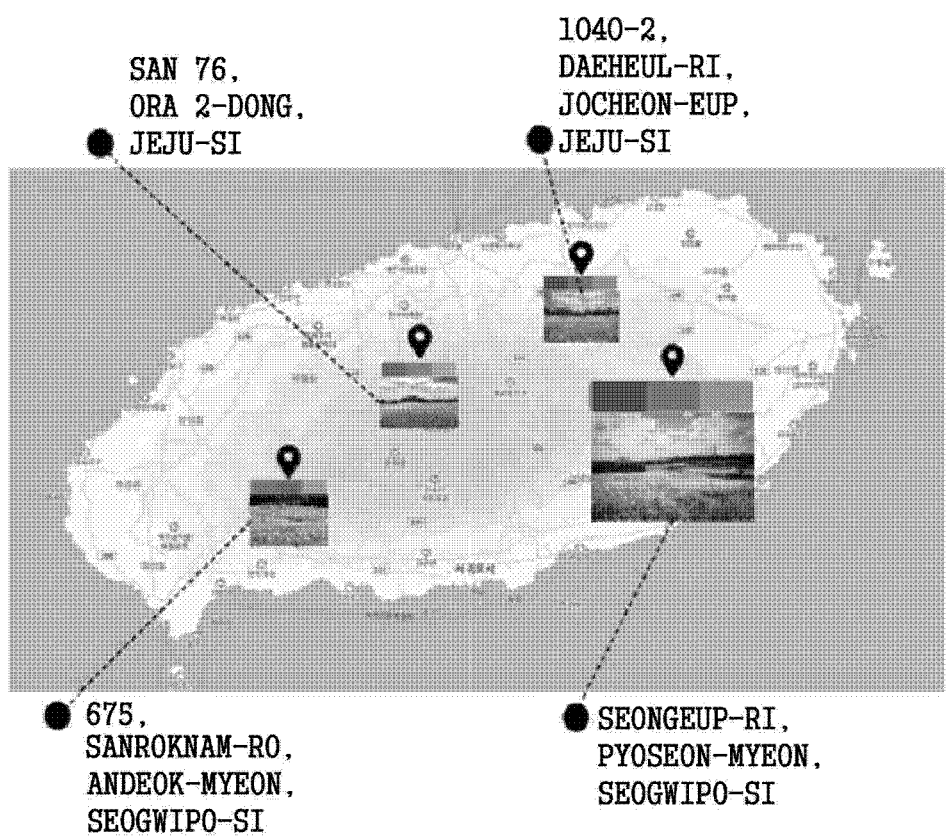
FIG. 8 is an illustrative screen of recommended travel destination information output by the travel destination retrieval server to a user terminal according to an embodiment of the present invention.

FIG. 8 is an illustrative screen of recommended travel destination information output by the travel destination retrieval server to the user terminal according to an embodiment of the present invention.

FIG. 8 illustrates information about four recommended travel destinations output when the user inputs a specific image in the case of retrieving a travel destination on Jeju Island.

The recommended travel destination information may be displayed on a map screen, and may be output together with a representative image at a location corresponding to each travel destination.

In FIG. 8, representative coloration information is displayed together with each representative image at the top of the representative image, and specific address information of the corresponding travel destination is additionally displayed.

However, this is only an example, and images and text may be displayed in various manners, such as displaying only a name of the corresponding travel destination instead of specific address information or displaying the name and address at the same time.

In this way, when the user uploads a specific image, representative color information of the image is extracted, and recommended travel destination information matching the extracted representative color information is displayed together with the representative image on the map screen as illustrated in FIG. 8, so that the user may be provided with recommended travel destination information using only an image corresponding to non-verbal information.

Figure 9:
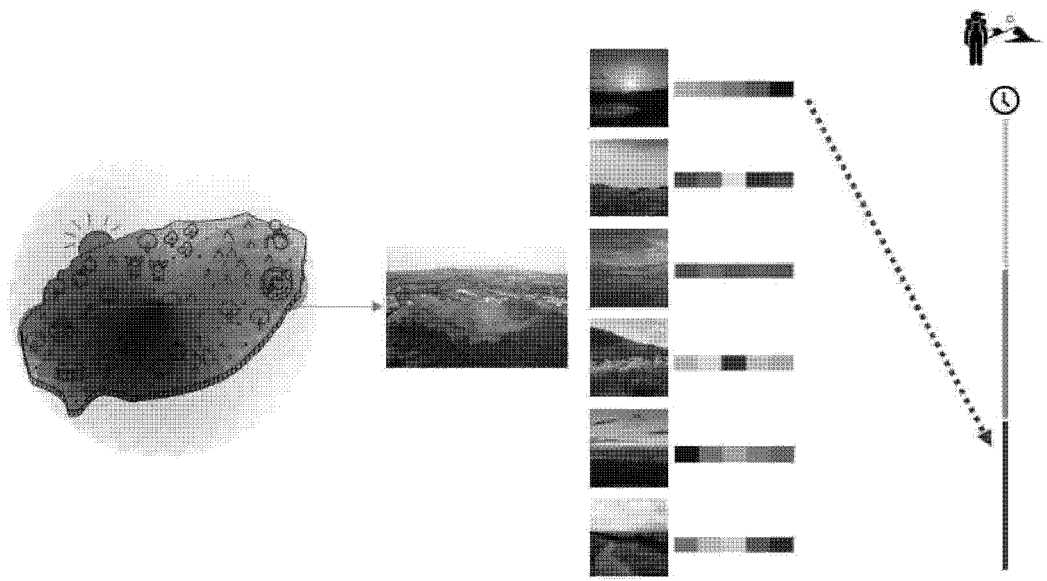
FIG. 9 is an illustrative screen of travel-related information using retrieval image information output by the travel destination retrieval server to the user terminal according to an embodiment of the present invention.

FIG. 9 is an illustrative screen of travel-related information using retrieval image information output by the travel destination retrieval server to the user terminal according to an embodiment of the present invention.

The travel destination retrieval server 100 according to an embodiment of the present invention may distribute a travel destination according to a travel schedule of the user for each place or provide travel possibility information based on a coloration space information database constructed as described above.

For example, when the user uploads a specific image to the user terminal 200, a list of recommended travel destinations for each specific travel destination may be calculated based on color information extracted from the image or based on information obtained by adding metadata or hashtag information to the color information, and it is possible to provide information such as a travel date and time predicted based on an uploaded image to an expected schedule planned by the user, or provide information about a possibility of travel to a landscape similar to the uploaded image as probability information, etc.

As described above, the travel destination retrieval system of the present invention may provide a recommended travel destination to the user based on an image and enable distribution of a travel destination according to a travel schedule of the user or simulation of a travel success possibility, etc., so that active travel destination retrieval can be performed based on image emotion information.

Figure 10:
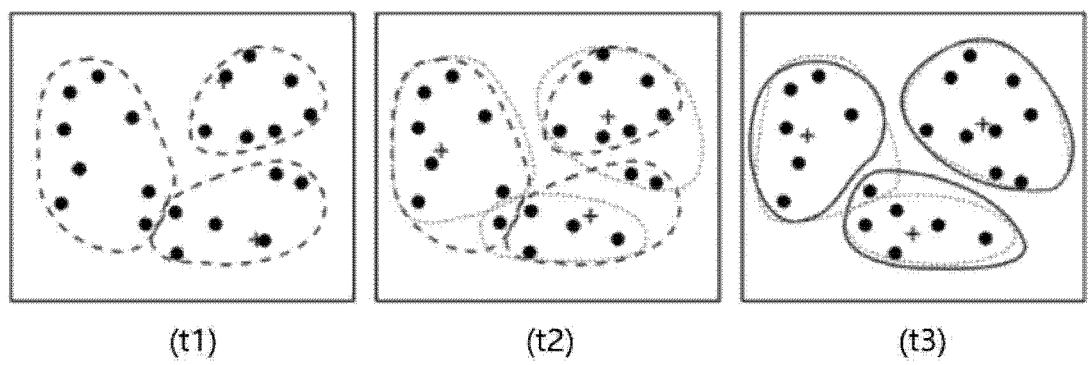
FIGS. 10, 11(*a*), and 11(*b*) are diagrams illustrating a concept of an unsupervised learning algorithm in which a DB of coloration space information is clustered through learning and a matching rate is improved over time according to an embodiment of the present invention.

FIGS. 10 and 11 are diagrams illustrating a concept of an unsupervised learning algorithm in which a DB of coloration space information is clustered through learning and a matching rate is improved over time according to an embodiment of the present invention.

Unsupervised learning used herein does not use labeled data unlike supervised learning, and a goal of an algorithm when using unsupervised learning is to find a relationship within data and group data points based only on the input data. Here, it is possible to find a cluster or a subgroup within unlabeled big data using clustering as unsupervised learning.

FIG. 10 is a diagram illustrating a process in which data is clustered through learning according to an embodiment of the present invention, and illustrates a concept of an unsupervised learning algorithm in which the matching rate is improved as time passes from t1 to t3.

That is, as a clustering result at an initial stage at t1, a region is divided into certain regions (k=3) as indicated by dashed lines. Thereafter, when the algorithm is repeated while updating centroids, the regions are reorganized into regions indicated by dotted lines as at t2. Further, as the amount of computation increases, updated values of the centroids converge, and clustering is determined in regions indicated by solid lines at t3.

Figure 11A:
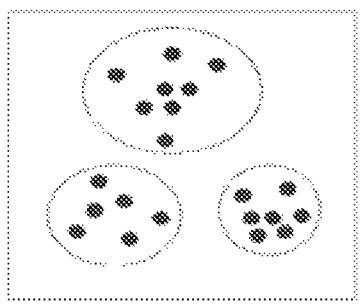
Figure 11B:
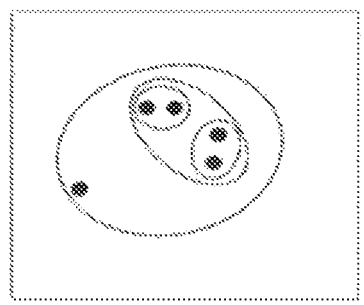

FIG. 11(a) is a set of clustering algorithms in which each data point of a data set can belong to only one cluster as partial clustering, and a k-means algorithm is a representative example thereof. FIG. 11(b) is a hierarchical system (cluster within a cluster) as hierarchical clustering, in which all data points may belong to a plurality of clusters, and some clusters may include smaller clusters.

Therefore, the data fusion unit of the present application compares and categorizes data by repeating an AI algorithm of an unsupervised learning method to generate highly related hashtags and IDs, and analyzes a correlation degree between hashtags and keywords linked to coloration space information according to a degree of influence of classified clustering. When the coloration space information is additionally generated, the data fusion unit repeats this analysis to perform patterning and clustering, so that it is possible to automatically construct a structured retrieval DB having a high matching rate from classification data combining coloration data and spatial information.

In a travel destination retrieval system and method using a coloration-based spatial information database according to an embodiment of the present invention, emotional attention and emotional aesthetics induced by an image are accumulated and learned over time based on the image to create a structured DB, and travel destination information that can provide similar sensibility can be automatically recommended or a desired destination can be retrieved based thereon. Therefore, there is an effect that a matching rate of non-standard data-based retrieval in a travel portal platform becomes higher and more sophisticated.

In addition, a travel destination retrieval system and method of the present invention may use not only a coloration-based database but also metadata included in a learned image and related data acquired therethrough to cluster all of a background image, a color set of color combinations, a hashtag, a keyword, temporal/spatial related data, and Nth-order utilization information through unsupervised learning, thereby comprehensively converting coloration and emotion data into a DB. Therefore, it is possible to construct a new qualitative database in terms of emotional engineering beyond the limits of keyword/text-based standard retrieval.

In addition, the present invention has an effect of enabling visual and intuitive retrieval of a travel destination by providing recommended image information based on a coloration-based spatial information database, and displaying representative image information along with one or more coloration combination color sets on a map application for recommended travel destination information.

The effect according to the present invention is not limited by content illustrated above, and a wider variety of effects is included in the present specification.

Those of ordinary skill in the art to which the present invention pertains will understand that the present invention may be embodied in other specific forms without changing the technical spirit or essential features thereof. Therefore, it should be understood that the embodiments described above are illustrative in all respects and not restrictive. The scope of the present invention is indicated by the following claims rather than the above detailed description, and all changes or modifications derived from the meaning and scope of the claims and equivalent concepts thereof should be interpreted as being included in the scope of the present invention.

What is claimed is:

1. A travel destination retrieval system using a coloration-based spatial information database and connected to a plurality of user terminals through a network, the travel destination retrieval system comprising:
    a data collection unit configured to collect image data from the user terminals;
    a coloration extraction unit configured to analyze the collected image data to extract at least one piece of representative coloration information;
    an ID generation unit configured to generate at least one piece of representative ID information related to the representative coloration information;
    a travel destination information generation unit configured to generate travel destination information corresponding to the representative coloration information and the representative ID information;
    a data fusion unit configured to generate coloration space information using a scheme of constructing a dataset by mapping the representative coloration information, the representative ID information, and the travel destination information to the image data;
    a data storage unit configured to store the generated coloration space information; and
    a travel destination information output unit configured to output recommended travel destination information in response to receiving information about a retrieval image for retrieving a travel destination from a user terminal based on a similarity between the image information and the coloration space information.

2. The travel destination retrieval system according to claim 1, further comprising an image preprocessing unit configured to remove or mask an obstructive object for a background from image data collected by the data collection unit, wherein:
    the image preprocessing unit removes or masks an obstructive object from the retrieval image;
    the coloration extraction unit extracts coloration information by analyzing the retrieval image from which the obstructive object is removed or masked; and
    the travel destination information output unit compares coloration information extracted from the received retrieval image with the coloration space information to output the recommended travel destination information.

3. The travel destination retrieval system according to claim 1, further comprising a metadata extraction unit configured to extract metadata of the image data, wherein:
    the travel destination information generation unit generates the travel destination information corresponding to the metadata; and
    the data fusion unit further maps the extracted metadata to the image data to generate the coloration space information.

4. The travel destination retrieval system according to claim 3, wherein the metadata includes time information and location information at which the image data is generated.

5. The travel destination retrieval system according to claim 3, further comprising a related data retrieval unit configured to retrieve related data through an Internet protocol network based on the mapped metadata, wherein the data fusion unit further maps the related data to the image data to generate the coloration space information.

6. The travel destination retrieval system according to claim 1, further comprising a hashtag information collection unit configured to collect hashtag information corresponding to the image data from the user terminal, wherein:
the travel destination information generation unit generates the travel destination information corresponding to the hashtag information; and
the data fusion unit additionally maps the hashtag information to the image data to generate the coloration space information.

7. The travel destination retrieval system according to claim 6, wherein the data fusion unit continuously reclassifies the coloration space information using a scheme of repeating an unsupervised AI learning algorithm to automatically cluster the dataset.

8. The travel destination retrieval system according to claim 1, further comprising a recommended information provision unit configured to provide recommended image information and recommended keyword information to the user terminals based on the coloration space information.

9. The travel destination retrieval system according to claim 8, wherein the recommended information provision unit provides the recommended image information and the recommended keyword information using at least one of time information, location information, or retrieval history information received from the user terminals.

10. The travel destination retrieval system according to claim 1, further comprising an image classification unit configured to analyze the image data collected by the data collection unit to classify or discard the image data for each preset category,
wherein the travel destination information output unit displays the recommended travel destination information together with a predetermined representative image at a corresponding location on a map screen on the user terminal.

11. A travel destination retrieval method using a coloration-based spatial information database and a server connected to a plurality of user terminals through a network, the travel destination retrieval method comprising:
collecting, by the server, image data from a user terminal;
analyzing, by the server, the collected image data to extract at least one piece of representative coloration information;
generating, by the server, at least one piece of representative ID information related to the representative coloration information;
generating, by the server, travel destination information corresponding to the representative coloration information and the representative ID information;
generating, by the server, coloration space information using a scheme of constructing a dataset by mapping the representative coloration information, the representative ID information, and the travel destination information to the image data;
receiving, by the server, information about a retrieval image for retrieving a travel destination from the user terminal; and
outputting, by the server, recommended travel destination information based on a similarity between the retrieval image information and the coloration space information.

12. The travel destination retrieval method according to claim 11, further comprising removing or masking, by the server, an obstructive object from the collected image data, wherein the outputting includes:
removing or masking an obstructive object for a background from the retrieval image; and
analyzing the retrieval image from which the obstructive object is removed or masked to extract coloration information.

13. The travel destination retrieval method according to claim 11, further comprising extracting, by the server, metadata of the image data,
wherein the generating of the travel destination information includes generating the travel destination information corresponding to the metadata, and the generating of the coloration space information includes generating the coloration space information by additionally mapping the metadata to the image data.

14. The travel destination retrieval method according to claim 13, further comprising retrieving, by the server, related data through an Internet protocol network based on the metadata,
wherein the generating of the coloration space information includes generating the coloration space information by additionally mapping the related data to the image data.

15. The travel destination retrieval method according to claim 14, wherein the generating of the coloration space information includes continuously reclassifying, by the server, the coloration space information using a scheme of repeating an unsupervised AI learning algorithm to automatically cluster the dataset.

16. The travel destination retrieval method according to claim 11, wherein the outputting includes displaying the recommended travel destination information together with a predetermined representative image at a corresponding location on a map screen on the user terminal.

* * * * *